United States Patent
Hara

(10) Patent No.: US 10,320,483 B2
(45) Date of Patent: *Jun. 11, 2019

(54) OPTICAL COMMUNICATION SYSTEM, OPTICAL RECEIVER, OPTICAL RECEIVER CONTROL METHOD, AND NON-TRANSITORY COMPUTER READABLE MEDIUM

(71) Applicant: NEC Corporation, Tokyo (JP)

(72) Inventor: Yasushi Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,852

(22) Filed: May 29, 2018

(65) Prior Publication Data

US 2018/0351644 A1    Dec. 6, 2018

Related U.S. Application Data

(63) Continuation of application No. 14/904,023, filed as application No. PCT/JP2014/002737 on May 26, 2014, now Pat. No. 10,009,102.

(30) Foreign Application Priority Data

Jul. 11, 2013 (JP) .................................. 2013-145488

(51) Int. Cl.
*H04B 10/06*    (2006.01)
*H04B 10/2507*   (2013.01)
(Continued)

(52) U.S. Cl.
CPC ..... *H04B 10/2507* (2013.01); *H04B 10/5561* (2013.01); *H04B 10/612* (2013.01);
(Continued)

(58) Field of Classification Search
CPC .... H04B 10/60; H04B 10/61; H04B 10/2507; H04B 10/2931; H04B 10/564;
(Continued)

(56) References Cited

U.S. PATENT DOCUMENTS 6,081,360 A * 6/2000 Ishikawa ............ H04B 10/2519
398/1
6,501,580 B1 * 12/2002 Ishikawa ............ H04B 10/2519
398/148

(Continued)

FOREIGN PATENT DOCUMENTS

| EP | 2 146 442 A2 | 1/2010 |
|---|---|---|
| JP | 2010-245772 | 10/2010 |
| JP | 2012-129960 | 7/2012 |

OTHER PUBLICATIONS

Supplementary European Search Report issued by the European Patent Office in counterpart European Patent Application No. 14823778.7, dated Feb. 2, 2017.

(Continued)

*Primary Examiner* — Hibret A Woldekidan
(74) *Attorney, Agent, or Firm* — Finnegan, Henderson, Farabow, Garrett & Dunner, L.L.P.

(57) ABSTRACT

Present invention provides an optical communication system that controls reception sensitivity of an optical receiver. The communication system (100) according to the present invention comprising: an optical transmitter (1) to which an transmission signal is input, and which modulates the transmission signal to an optical signal and transmits the optical signal; and an optical receiver (2) that receives the optical signal and demodulates the optical signal to an transmission signal. And the optical receiver (2) includes a photoelectric conversion means (10) for converting the optical signal into an analog electric signal, a conversion and demodulation means (25) for converting the analog electric signal into a
(Continued)

digital signal and demodulating the signal to the transmission signal, and an amplitude control means (102) for controlling amplitude of the analog electric signal, and the amplitude control means (102) controls the amplitude of the analog electric signal in accordance with wavelength dispersion of the optical signal.

9 Claims, 12 Drawing Sheets

(51) Int. Cl.
*H04B 10/556* (2013.01)
*H04B 10/61* (2013.01)
*H04L 27/20* (2006.01)
*H04L 27/38* (2006.01)

(52) U.S. Cl.
CPC ......... *H04B 10/614* (2013.01); *H04B 10/616* (2013.01); *H04B 10/6161* (2013.01); *H04L 27/2096* (2013.01); *H04L 27/3809* (2013.01)

(58) Field of Classification Search
CPC ............... H04B 10/07; H04B 10/0775; H04B 10/0795; H04B 10/2525; H04B 10/6161; H04B 10/5561; H04B 10/612; H04B 10/614; H04B 10/616; H04B 10/611; H04B 10/672; H04B 10/6163; H04B 10/07951; H04B 10/6931; H04B 10/6963; H04B 10/2513; H04B 10/25133; H04B 10/07955; H04B 10/693; H04B 2210/252; H04L 27/2096; H04L 27/3809; G02B 6/29394; H03F 3/08
USPC ........ 398/202, 208, 209, 210, 159, 158, 160
See application file for complete search history.

(56) References Cited

U.S. PATENT DOCUMENTS

| | | | | |
|---|---|---|---|---|
| 6,819,477 B2* | 11/2004 | Tsuzaki | ............... | H04B 10/2916 359/333 |
| 7,035,548 B2* | 4/2006 | Ooi | ................... | H04B 10/2507 398/147 |
| 7,340,187 B2 | 3/2008 | Takeshita | | |
| 7,536,108 B2* | 5/2009 | Hirano | ............. | H04B 10/25133 398/147 |
| 7,860,409 B2* | 12/2010 | Sato | ..................... | H04B 10/673 398/212 |
| 8,086,113 B2* | 12/2011 | Nakashima | ............ | H04B 10/60 398/205 |
| 8,165,465 B2* | 4/2012 | Tanaka | ............... | H04B 10/6971 398/102 |
| 8,249,464 B2* | 8/2012 | Oda | ........................ | H04B 10/60 398/162 |
| 8,676,054 B2* | 3/2014 | Suzuki | ................... | H04B 10/27 398/202 |
| 9,071,355 B2* | 6/2015 | Yu | ..................... | H04B 10/25133 |
| 9,100,139 B2 | 8/2015 | Schmidt et al. | | |
| 9,692,545 B2* | 6/2017 | Yamauchi | .......... | H04B 10/0799 |
| 10,009,102 B2* | 6/2018 | Hara | .................. | H04L 27/2096 |
| 10,044,439 B2* | 8/2018 | Kurisu | .............. | H04B 10/6166 |
| 10,103,807 B2* | 10/2018 | Gong | ..................... | H04B 10/07 |
| 2004/0218933 A1 | 11/2004 | Fludger et al. | | |
| 2005/0110981 A1* | 5/2005 | Hayashi | ............... | G01M 11/333 356/73.1 |
| 2008/0267638 A1 | 10/2008 | Nakashima et al. | | |
| 2008/0272943 A1 | 11/2008 | Tanimura et al. | | |
| 2009/0226189 A1 | 9/2009 | Ito | | |
| 2010/0254718 A1 | 10/2010 | Oda et al. | | |
| 2011/0019995 A1 | 1/2011 | Suzuki et al. | | |
| 2012/0155883 A1* | 6/2012 | Tanaka | ............... | H04B 10/6161 398/115 |
| 2012/0232819 A1 | 9/2012 | Yu et al. | | |

OTHER PUBLICATIONS

R. Borkowski et al., "Experimental Adaptive Digital Performance Monitoring for Optical DP-QPSK Coherent Receiver", 37$^{th}$ European Conference and Exhibition on Optical Communication (ECOC), pp. 1-3, Sep. 2011.

International Search Report dated Jun. 24, 2014 in corresponding PCT International Application.

* cited by examiner

OPTICAL COMMUNICATION SYSTEM, OPTICAL RECEIVER, OPTICAL RECEIVER CONTROL METHOD, AND NON-TRANSITORY COMPUTER READABLE MEDIUM

CROSS-REFERENCE TO RELATED PATENT APPLICATIONS

This application is a continuation of U.S. application Ser. No. 14/904,023, filed on Jan. 8, 2016, which is a National Stage Entry of International Application No. PCT/JP2014/002737, filed May 26, 2014, which claims priority from Japanese Patent Application No. 2013-145488, filed Jul. 11, 2013. The entire contents of the above-referenced applications are expressly incorporated herein by reference.

TECHNICAL FIELD

The present invention relates to an optical communication system, an optical receiver, an optical receiver control method, and a non-transitory computer readable medium.

BACKGROUND ART

Along with an increase in demand of data communication service in recent years, the introduction of a longer-distance, larger-volume high-density wavelength multiplexing optical fiber communication system with higher reliability is being promoted. On such a background, higher performance of an optical communication system that uses optical fibers is being demanded. As part thereof, the adoption of a digital coherent reception system in which a digital processing technique is introduced to an optical receiver is being promoted.

In the digital coherent reception system, it is possible to correct, by digital processing, linear degradation of an optical waveform due to optical fiber transmission, and compensate transmission characteristic degradation due to a wavelength dispersion characteristic of an optical fiber as a transmission channel. However, due to the wavelength dispersion, an optical signal waveform collapses and expands in an amplitude direction, so in a digital conversion, a dynamic range for an analog/digital conversion becomes a problem.

As a communication system that takes the wavelength dispersion characteristic into consideration, Patent Literature 1 discloses a method of changing a dynamic range at a time when an analog electric signal is converted into a digital electric signal by monitoring wavelength dispersion.

CITATION LIST

Patent Literature 1: Japanese Unexamined Patent Application Publication No. 2012-129960

SUMMARY OF INVENTION

Technical Problem

In the method of changing the dynamic range, when the wavelength dispersion is small, control is performed to reduce the dynamic range. Accordingly, a resolution in the analog/digital conversion is not changed, and sensitivity at a time when the digital electric signal is demodulated is not also changed.

The purpose of the present invention is to provide an optical communication system that controls reception sensitivity of an optical receiver in accordance with wavelength dispersion.

Solution to Problem

An example of a communication system comprising:
an optical transmitter to which an transmission signal is input, and which modulates the transmission signal to an optical signal and transmits the optical signal; and
an optical receiver that receives the optical signal and demodulates the optical signal to an transmission signal, wherein
the optical receiver includes a photoelectric conversion means for converting the optical signal into an analog electric signal, a conversion and demodulation means for converting the analog electric signal into a digital signal and demodulating the signal to the transmission signal, and an amplitude control means for controlling amplitude of the analog electric signal, and
the amplitude control means controls the amplitude of the analog electric signal in accordance with wavelength dispersion of the optical signal.

An example of an optical receiver comprising:
a photoelectric conversion means for converting an optical signal into an analog electric signal;
a conversion and demodulation means for converting the analog electric signal into a digital signal and demodulating the signal to an transmission signal; and
an amplitude control means for controlling amplitude of the analog electric signal,
wherein the amplitude control means controls the amplitude of the analog electric signal in accordance with wavelength dispersion of the optical signal.

An example of an optical receiver control method, wherein an optical receiver is configured to convert an optical signal into an analog electric signal, convert the analog electric signal into a digital signal, and demodulate the signal to an transmission signal,
the control method comprising controlling amplitude of the analog electric signal in accordance with wavelength dispersion of the optical signal.

An example of a non-transitory computer readable medium for causing a computer to execute an optical receiver control method, wherein
an optical receiver is configured to convert an optical signal into an analog electric signal, convert the analog electric signal into a digital signal, and demodulate the digital signal to an transmission signal, and
the control method includes controlling amplitude of the analog electric signal in accordance with wavelength dispersion of the optical signal.

Advantageous Effects of Invention

According to the aspects described above, it is possible to provide an optical communication system that controls the reception sensitivity of the optical receiver.

DESCRIPTION OF EMBODIMENTS

First, studied matters about relevant techniques until the present invention has been conceived will be described.

Figure 12:
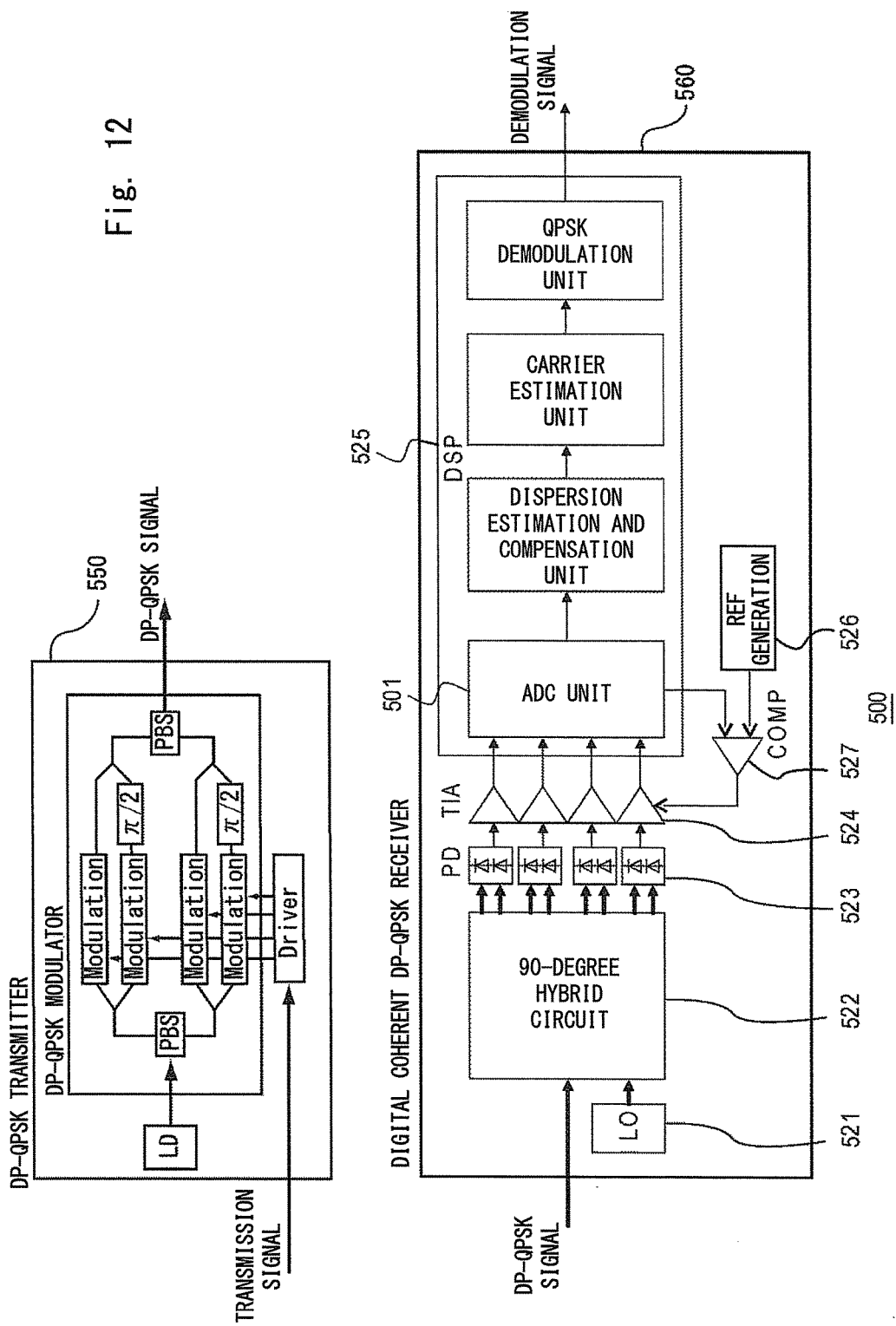
FIG. 12 shows a communication system as a technique to which the present invention is relevant.

FIG. 12 shows a communication system 500 as a technique to which the present invention is relevant. A digital coherent receiver 560 shown in FIG. 12 receives optical signal transmitted from an optical transmitter 550, causes local light to be interfered in a 90-degree hybrid circuit 522, converts the light into an analog electric signal by coherent detection in PDs (Photo Diodes) 523, sets signal amplitude to be constant in analog amplifiers 524, and inputs the signal to an ADC (Analog/Digital Converter) unit 501 of a DSP (Digital Signal Processor) 525.

The analog amplifier 524 is subjected to gain control in such a manner that average amplitude of the analog electric signal that is converted to the electric signal is constant, but the waveform of the optical signal received is expanded in a temporal axis direction by being affected by wavelength dispersion of an optical fiber as a transmission channel. The wavelength dispersion is such a phenomenon that, during transmission of optical pulses in an optical fiber, light beams with different wavelengths are transmitted at different speeds in the optical fiber, and thus a width of an optical signal is temporally expanded. Then, a number of waveforms that are expanded in the temporal axis direction are superposed, thereby increasing the amplitude of a reception signal and causing the waveform to change at random.

To perform digital processing for an analog signal in the DSP 525, in the ADC unit 501, it is necessary to perform a digital signal conversion for entire analog signal amplitude. Accordingly, it is necessary to control an output of the analog amplifier 524 in such a manner that a peak (maximum value) of the analog signal amplitude input to the ADC unit 501 is equal to or less than a dynamic range (width between the minimum value and the maximum value of an analog signal input range which can be identified) of the ADC unit 501.

As a method of controlling the gain (input/output ratio) of the analog amplifier 524, generally, used is such a method that the output amplitude of the analog amplifier 524 is monitored, a comparator 527 compares the output amplitude and a preset reference value output from a reference generation circuit 526 with each other, and a feedback is given to the gain control for the analog amplifier 524.

In the relevant technique, the reference value output from the reference generation circuit 526 is fixed, and the reference value is set in accordance with the maximum value of wavelength dispersion of the transmission channel. Therefore, even in the case where a dispersion value is small, and distortion of a signal waveform is small, the signal amplitude is controlled to be small. In the case where the wave dispersion is small, and the distortion of the signal waveform is small, it is possible to increase the signal amplitude and enhance the resolution in the ADC relatively. However, because the signal amplitude is set to be constant, the transmission signal amplitude to the ADC unit 501 is not changed, which is a problem in that the reception sensitivity of the optical receiver is not changed as compared to the case where the wavelength dispersion is at maximum.

In a relevant digital coherent reception circuit, the input amplitude of the ADC is uniformly set irrespective of a wavelength dispersion value. In the case where the wavelength dispersion value of the transmission channel is large, the waveform of a reception signal is distorted due to the wavelength dispersion, resulting in an increase in the peak of the amplitude. Further, performing uniform amplitude control for the reception signal results in falling out of the dynamic range of the ADC. For this reason, when the reference value that is input to the comparator 527 is set to be small, and the analog signal amplitude that is input to the ADC is set to be small, it is confirmed that the receptions sensitivity is improved.

However, in the case where the reference value is set to be small, the signal amplitude after dispersion compensation also becomes small. In the case where the wavelength dispersion of the transmission channel is small, the distortion of the waveform is also small, and the peak of the amplitude is also small. But, there is a problem in that the analog signal amplitude input to the ADC remains small, and the reception sensitivity is not improved. The present invention has been made on the background as described above, and embodiments of the present invention will be described below.

Embodiment 1

Figure 1:
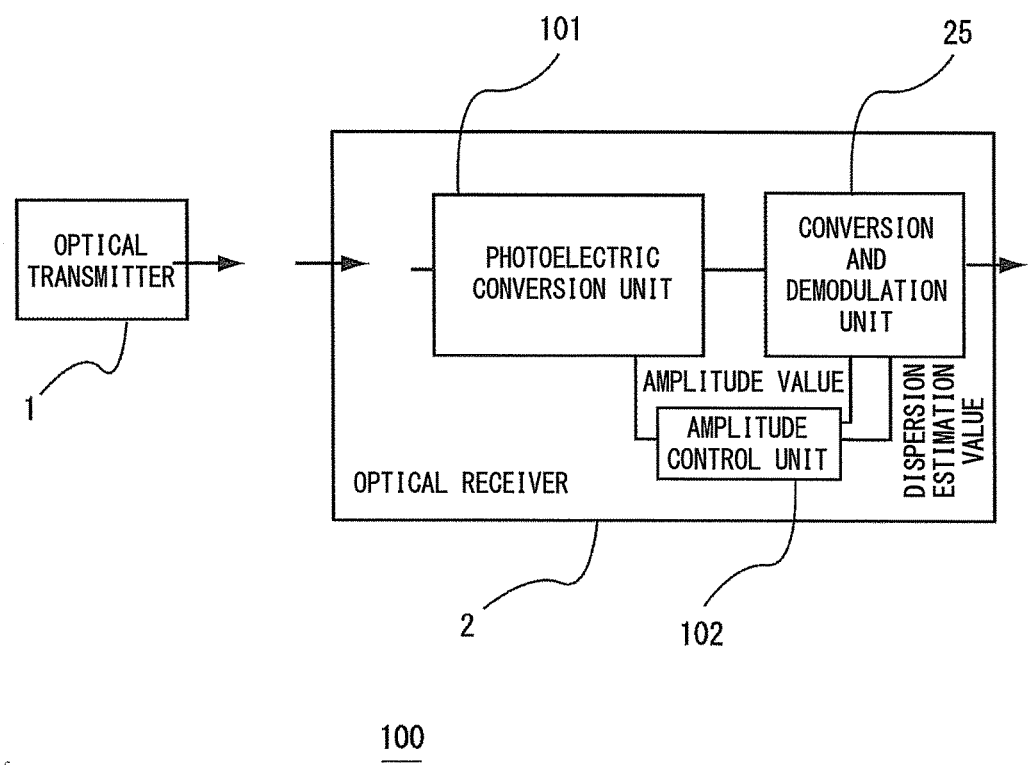
FIG. 1 shows a structural example of an optical communication system 100 according to first embodiment of the present invention.

FIG. 1 shows a structural example of an optical communication system 100 according to this embodiment. FIG. 1 shows an optical transmitter with a DP-QPSK (Dual Polarization-Quadrature Phase Shift Keying) system and an optical receiver with a digital coherent system. The optical communication system 100 is provided with a DP-QPSK transmitter (optical transmitter) 1 and a digital coherent DP-QPSK receiver (optical receiver) 2.

Figure 2:
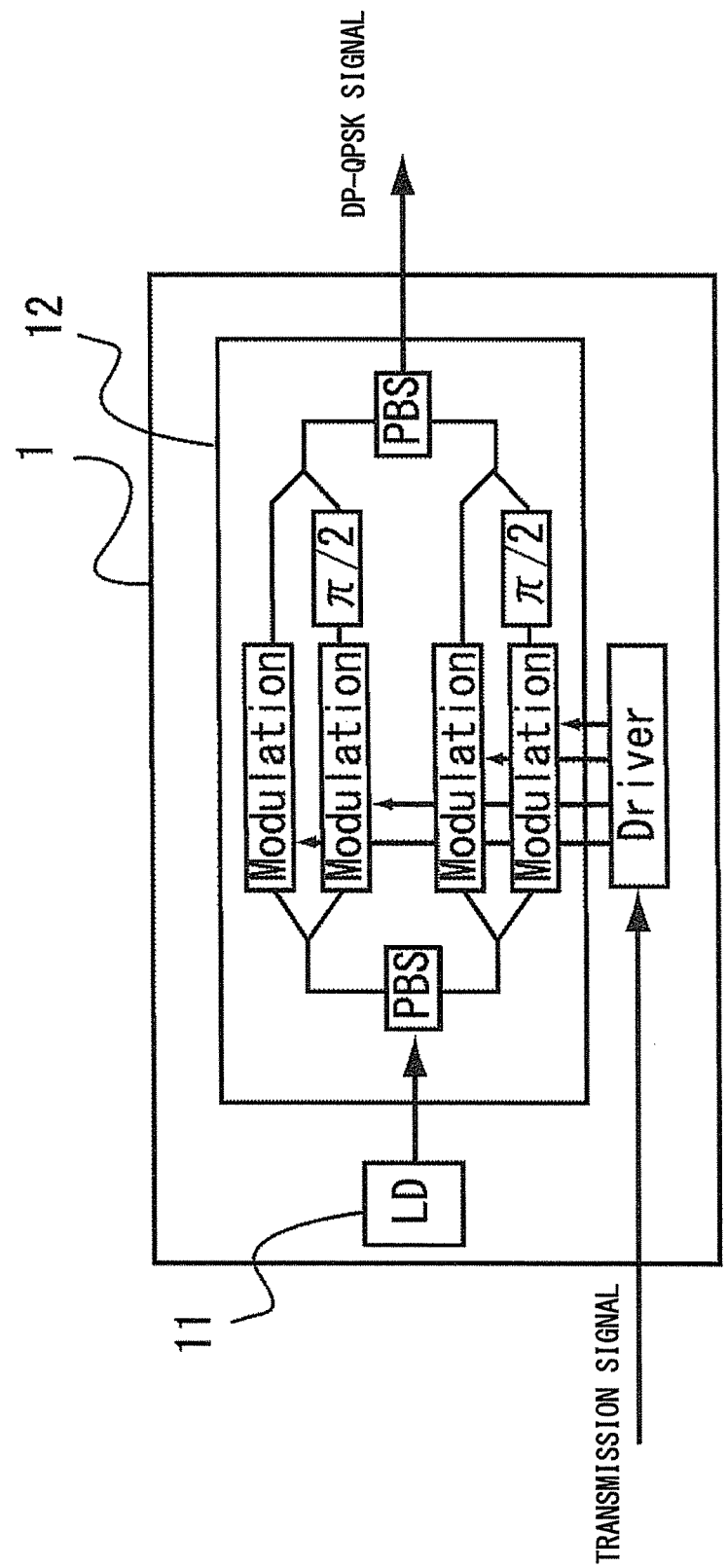
FIG. 2 is a diagram showing the structure of an optical transmitter 1 according to first embodiment of the present invention.

FIG. 2 is a diagram showing the structure of the optical transmitter 1. The optical transmitter 1 is provided with a circuit for generating and transmitting a DP-QPSK signal. The optical transmitter 1 is provided with an LD (Laser Diode) 11 that generates CW (Continuous Wave) light as a light source of signal light and a DP-QPSK modulator 12 that performs DP-QPSK modulation for the CW light from the LD 11 with an input electric signal (input signal).

The DP-QPSK modulator 12 divides the CW light into two light beams, performs QPSK modulation for each light beam, then orthogonalizes polarization planes at 90 degrees, and performs multiplexing, thereby generating a polarization multiplexed signal. The optical transmitter 1 indicates the structure of a general DP-QPSK transmitter.

Figure 3:
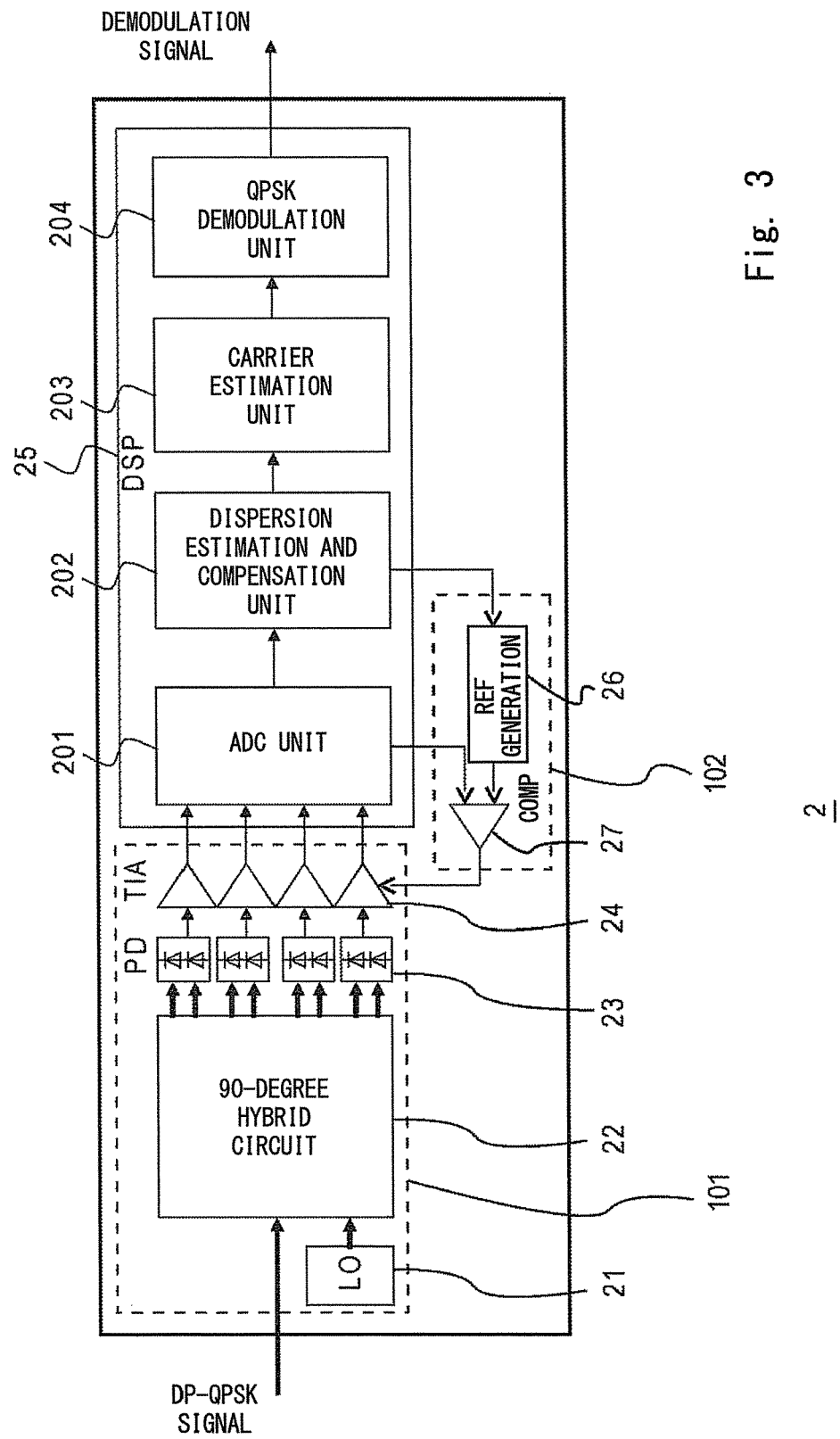
FIG. 3 is a diagram of an optical receiver 2 according to first embodiment of the present invention.

FIG. 3 is a diagram showing the structure of the optical receiver 2. The optical receiver 2 is provided with a photoelectric conversion unit 101 to which an optical signal is input, and which causes the signal to be interfered with local light and converts the optical signal into an electric signal, a conversion and demodulation unit (DSP: Digital Signal Processor) 25 that converts the analog electric signal input from the photoelectric conversion unit 101 into a digital signal and performs wavelength dispersion compensation and demodulation of the DP-QPSK signal by digital processing, and an amplitude control unit 102.

The photoelectric conversion unit 101 is provided with a local light generation unit (LO; Local Oscillator) 21 that generates local light, a 90-degree hybrid circuit 22 for inputting and causing the received DP-QPSK signal and the local light from the LO 21 to interfere with each other, PDs (Photo Diodes) 23 that perform coherent detection for the optical signal interfered in the 90-degree hybrid circuit 22 and convert the signal into an analog electric signal, and analog amplifiers (TIAs; Trans Impedance AMPs) 24 that input the analog electric signal from the PDs 23 and amplify the analog electric signal to a predetermined amplitude by a gain control signal from a comparator (COMP; Comparator) 27.

FIG. 3 shows a block diagram of the internal structure of the conversion and demodulation unit 25. The conversion and demodulation unit 25 is provided with an ADC unit 201 that converts the analog electric signal into a digital signal, a dispersion estimation and compensation unit 202 that estimates and compensates wavelength dispersion and polarization dispersion, a carrier estimation unit 203 that extracts a carrier from the signal that has been digital conversion and reproduces a clock, and a QPSK demodulation unit 204 that demodulates a QPSK signal and generates an electric signal (output signal) having the same waveform as an original signal.

Here, the polarization dispersion is such a phenomenon that, due to distortion of an optical fiber, a reflection direction of light in the fiber is divided into slow components and rapid components, with the result that a difference is generated in the time of arrival, and a signal component width is increased.

The ADC unit 201 monitors average amplitude of the input analog electric signal and outputs a monitored value to the comparator 27.

The dispersion estimation and compensation unit 202 outputs a dispersion estimation result to a reference generation circuit 26. The carrier estimation unit 203 detects phase states of the signal light and local light of the signal that has been subjected to the dispersion compensation and performs phase correction. The QPSK demodulation unit 204 demodulates the phase-corrected signal and restores the signal to a data signal that is identical to the transmission signal in the optical transmitter.

Figure 4:
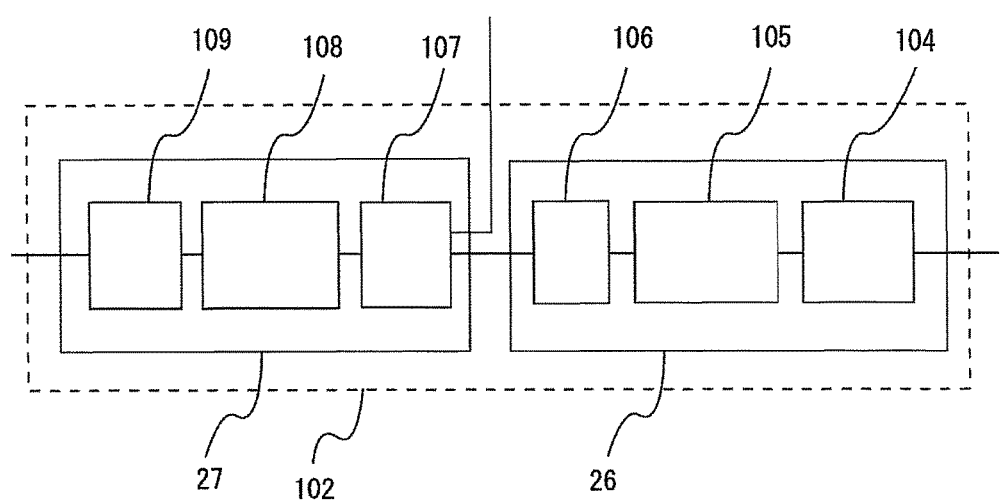
FIG. 4 is a diagram of an amplitude control unit 102 according to first embodiment of the present invention.

FIG. 4 is a block diagram showing the internal structure of the amplitude control unit 102. The amplitude control unit 102 is provided with the reference generation circuit 26 to which a dispersion estimation result is input from the conversion and demodulation unit 25 and which generates a reference value and the comparator (COMP) 27 to which an amplitude monitored value of the analog electric signal is input from the conversion and demodulation unit 25, and which compares the value with the reference value input from the reference generation circuit 26 and outputs a gain control signal to the analog amplifier 24.

As shown in FIG. 4, the reference generation circuit 26 is provided with an input unit 104 serving as an interface to which the dispersion estimation value output from the dispersion estimation and compensation unit 202 is input, a computation unit 105 that calculates an optimal reference value on the basis of the dispersion estimation value, and an output unit 106 serving as an interface for outputting the reference value to the comparator 27. The structure described above is merely an example, and another device structure may be used.

As shown in FIG. 4, the comparator 27 is provided with an input unit 107 serving as an interface to which the reference value output from the reference generation circuit 26 and the amplitude monitored value output from the ADC unit are input, a comparison unit 108 that compares the reference value and the amplitude monitored value with each other, and an output unit 109 serving as an interface for outputting a gain control signal based on a result of the comparison between the reference value and amplitude monitored value to the analog amplifier 24. The structure described above is merely an example, and another device structure may be used.

Explanation of Processing

Subsequently, with reference to FIG. 2 and FIG. 3, processing of a communication system 100 according to this embodiment will be described. The optical transmitter 1 uses an input electric signal to perform DP-QPSK modulation for CW light from the LD 11 and transmits the light to the transmission channel. The optical receiver 2 inputs a DP-QPSK optical signal received from the transmission channel and local light generated in the local light generation unit 21 to the 90-degree hybrid circuit 22. The 90-degree hybrid circuit 22 respectively divides the input optical signal and local signal into four and adjusts the polarization and the phase in such a manner that the DP-QPSK signal can be demodulated to multiplex the optical signal and the local light.

The 90-degree hybrid circuit 22 inputs the multiplexed light to the four PDs 23 and causes the signal light and the local light to interfere with each other, thereby converting phase modulation into amplitude modulation and generating an analog electric signal. The analog electric signal is faint, so the signal is amplified to a predetermined amplitude by the analog amplifiers 24. At this time, the comparator 27 uses a control signal to adjust a gain of the analog amplifier 24 in such a manner that the signal amplitude in the input of the ADC unit 201 in the conversion and demodulation unit 25 becomes constant.

Figure 5:
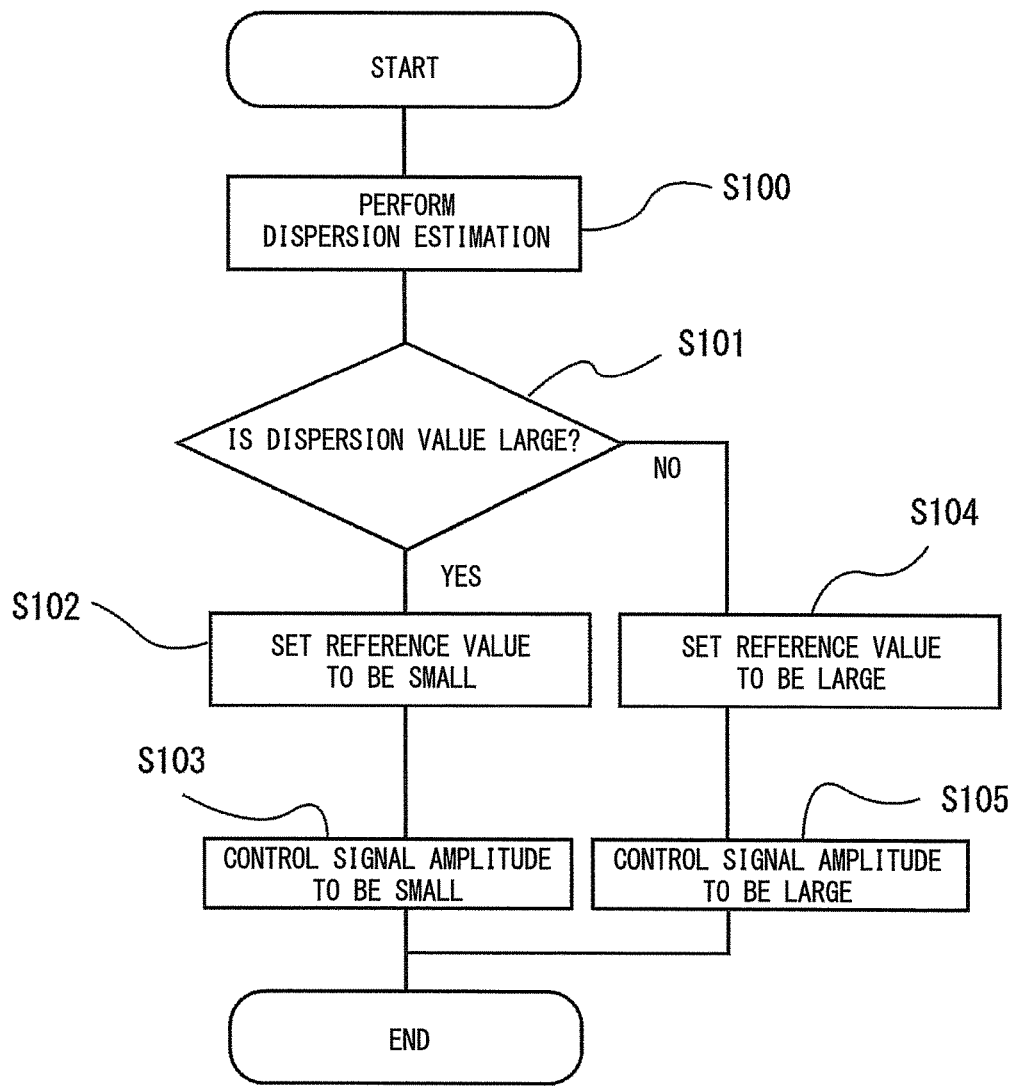
FIG. 5 is a flowchart of a method for communication according to first embodiment of the present invention.

FIG. 5 is a flowchart showing the processing of a method for controlling the communication system 100. The optical signal transmitted from the optical transmitter 1 is received by the optical receiver 2. The optical receiver performs computation of a wavelength dispersion estimation value of the received optical signal (S100). The optical receiver 2 compares the wavelength dispersion estimation value with the predetermined reference value to determine whether the wavelength dispersion estimation value is larger than the reference value or not (S101).

In the case where the optical receiver 2 determines that the wavelength dispersion value is larger than the reference value (S101: yes), the optical receiver 2 sets the reference value to be small (S102). On the basis of the reference value, the optical receiver 2 controls the amplitude of the analog electric signal to be small (S103). In the case where the optical receiver 2 determines that the dispersion value is smaller than the reference value (S101: no), the optical receiver 2 sets the reference value to be large (S104). On the basis of the reference value, the optical receiver 2 controls the amplitude of the analog electric signal to be large (S105).

Figure 6:
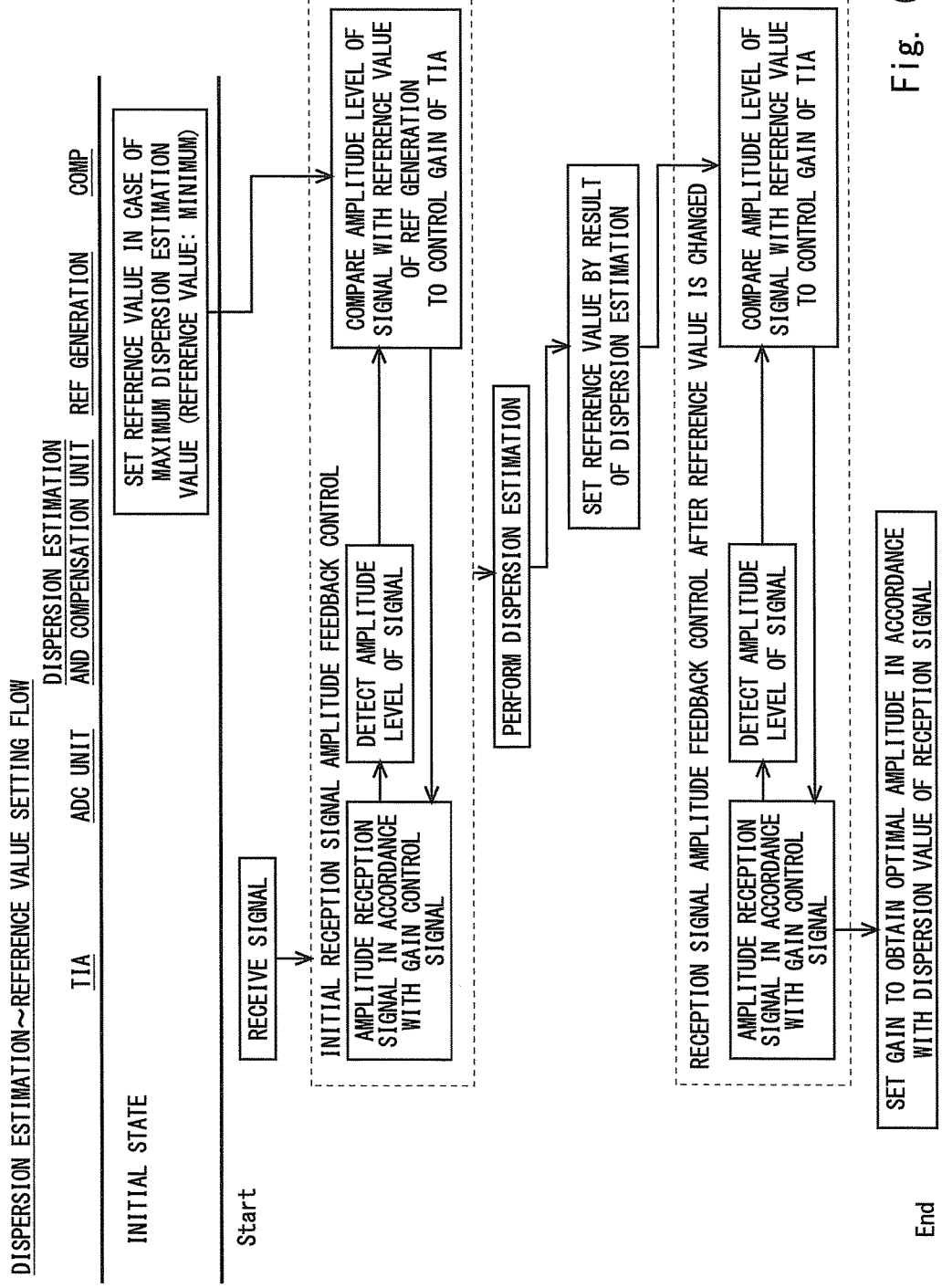
FIG. 6 is a sequence diagram of a method for communication according to first embodiment of the present invention.

FIG. 6 is a sequence diagram showing processing of each unit of the optical receiver 2.

As an initial state, the reference generation circuit 26 generates a reference value in the case where the wavelength dispersion estimation value is at the maximum, that is, a minimum reference value, and the comparator 27 uses the reference value to set the gain of the analog amplifier 24. Here, in the case of the wavelength dispersion of the input transmission signal is at the maximum, the maximum peak value of the signal amplitude is obtained. The comparator 27 performs control to set the gain of the TIA 24 to be small with the minimum reference value, so the input amplitude to the ADC unit 201 does not exceed the dynamic range.

The analog amplifier 24 amplifies the analog electric signal and inputs the signal to the conversion and demodulation unit 25.

The conversion and demodulation unit 25 samples the input analog electric signal in the ADC unit 201 and converts amplitude information into a digital signal.

The ADC unit 201 monitors the amplitude of the analog electric signal and outputs a monitored value to the comparator 27. The ADC unit 201 performs sampling on the basis of the waveform of the analog signal, converts the analog signal into a digital signal, and inputs the signal to the dispersion estimation and compensation unit 202. The dispersion estimation and compensation unit 202 estimates a wavelength dispersion value and a polarization dispersion value by a numerical value calculation and compensates the wavelength dispersion on the basis of the estimation result.

The dispersion estimation and compensation unit 202 also outputs the wavelength dispersion estimation value to the reference generation circuit 26. The carrier estimation unit 203 detects phase states of the signal light and the local light of the signal that has been subjected to the dispersion compensation and performs phase correction. The QPSK demodulation unit 204 demodulates the signal that has been subjected to the phase correction and restores the signal to the original signal.

The reference generation circuit 26 inputs the wavelength dispersion estimation value from the dispersion estimation and compensation unit 202 of the conversion and demodulation unit 25 through the input unit 104. The input unit 104 outputs the wavelength dispersion estimation value to the computation unit 105. The computation unit calculates an optimal reference value corresponding to the wavelength dispersion value in such a manner that the input amplitude to the ADC unit 201 is optimized in accordance with the wavelength dispersion estimation value from the dispersion estimation and compensation unit 202. As the reference value computation means, a table may be referred to, or calculation may be used. The computation unit outputs the reference value to the comparator 27 through the output unit 106.

Here, in the case where the wavelength dispersion of the transmission signal is smaller than a predetermined reference value, a difference between signal amplitude after the dispersion compensation and a peak value of signal amplitude of an electric signal before the dispersion compensation becomes small. As a result, in order to enhance reception sensitivity of a signal, it is possible to increase the input amplitude of the analog signal to the ADC unit 201. In view of this, in signal processing in the conversion and demodulation unit 25, the gain of the TIA is increased so as not to be outside of the dynamic range, and the input amplitude to the ADC unit is optimized.

The comparator 27 inputs the amplitude monitored value of the analog electric signal from the ADC unit 201 of the conversion and demodulation unit 25 and the reference value from the reference generation circuit 26 through the input unit 107. The input unit 107 outputs the amplitude monitored value and the reference value to the comparison unit 108. The comparison unit 108 compares the amplitude monitored value and the reference value with each other.

Through the output unit 109, the comparison unit 108 performs control to set the gain of the analog amplifier 24 to be small in the case where the amplitude monitored value is larger than the reference value and performs control to set the gain of the analog amplifier 24 to be large in the case where the amplitude monitored value is smaller than the reference value.

That is, in the case where the amplitude monitored value is larger than the reference value, the comparison unit 108 performs control to set the amplitude of the analog electric signal to be small. Further, in the case where the amplitude monitored value is smaller than the reference value, the comparison unit 108 performs control to set the amplitude of the analog electric signal to be large. Note that in the case where the reference value is equal to the amplitude monitored value, the comparison unit 108 does not control the amplitude of the analog electric signal. By this control, the analog amplifier 24 makes an adjustment in such a manner that the amplitude of the analog signal to be output is equal to the reference value output from the reference generation circuit 26.

In the analog electric signal output from the analog amplifier 24, a waveform thereof is distorted due to the dispersion of the transmission channel, a temporal distribution of the signal is expanded along with an increase in the wavelength dispersion value, and a variation of the amplitude is increased due to superposition of the signals. As a result, in the case where the wavelength dispersion of the transmission channel is large, the peak value of the electric signal before the dispersion compensation is increased relative to the signal amplitude after the dispersion compensation. On the other hand, in the case where the wavelength dispersion value of the transmission channel is small, the temporal distribution of the signal is small, and the variation of the amplitude becomes small, so it is possible to increase the input amplitude of the analog signal to the ADC unit 201 within an acceptable range of the ADC unit 201.

Further, as an example, the control method for the amplitude of the analog electric signal may be a method as follows: in the case where a first amplitude corresponding to a first wavelength dispersion value as a reference is provided, if a second wavelength dispersion value is smaller than the first wavelength dispersion value, control is performed to set a second amplitude to be larger relative to the first amplitude, and if the second wavelength dispersion value is larger than the first wavelength dispersion value, control is performed to set the second amplitude to be smaller relative to the first amplitude.

Explanation of Effects

According to this embodiment, the wavelength dispersion value of the reception signal estimated by the dispersion estimation and compensation unit 202 of the conversion and demodulation unit 25 is input to the reference generation circuit, and in accordance with the estimated wavelength dispersion value, the reference value can be changed. As a result, the gain control for the analog amplifier 24 is performed in such a manner that the input amplitude of the analog electric signal to the ADC unit 201 in accordance with the wavelength dispersion value of the reception signal, making it possible to optimally adjust the reception sensitivity.

Through the processing described above, the DP-QPSK optical receiver 2 adjusts the amplitude of the analog electric signal in the input of the ADC unit 201 of the optical receiver 2 to be the optimal value at all times in accordance with the wavelength dispersion value of the transmission channel of the optical signal, with the result that a reduction in the reception sensitivity of the signal can be avoided.

Embodiment 2

Figure 7:
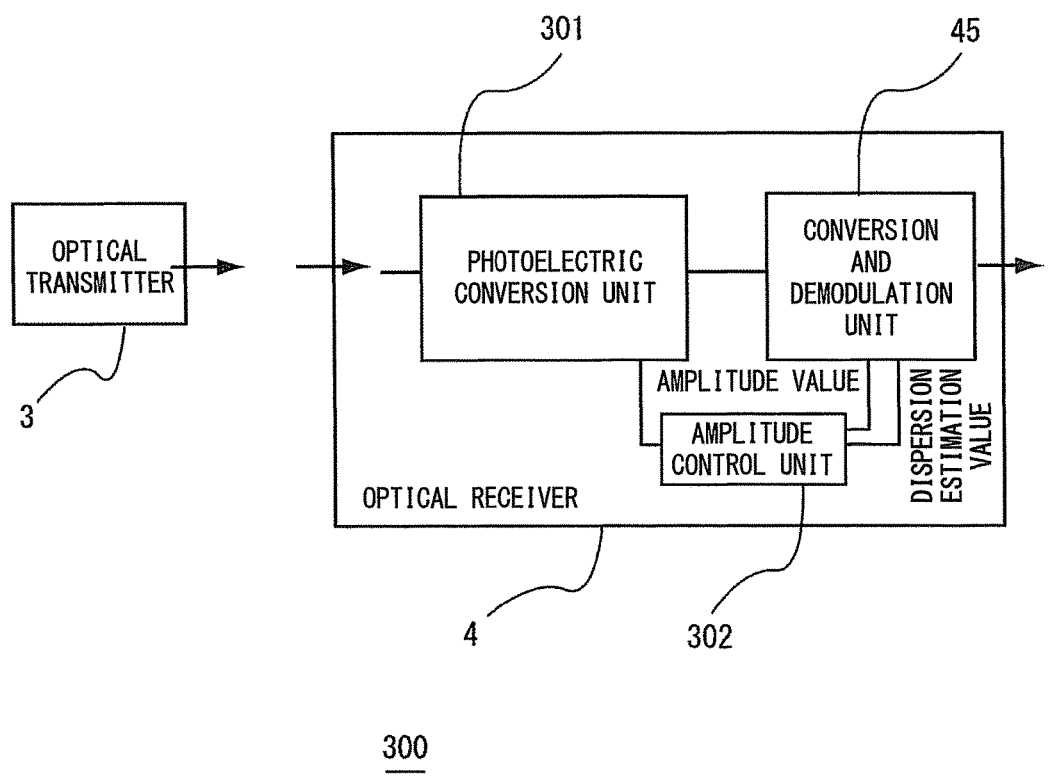
FIG. 7 is a diagram of a communication system 300 according to second embodiment of the present invention.

In Embodiment 1, the example by the DP-QPSK communication system is described. In this embodiment, an example using a DP-BPSK (Dual Polarization-Binary Phase Shift Keying) system is described. FIG. 7 shows a structural example of an optical communication system 300 according to this embodiment. FIG. 7 shows a structure in the case where the embodiment of the present invention is applied to a DP-BPSK modulation system. In FIG. 7, an optical transmitter and a digital coherent receiver with the DP-BPSK system are shown as an example. The optical communication system 300 is provided with a DP-BPSK transmitter (optical transmitter) 3 and a digital coherent DP-BPSK receiver (optical receiver) 4.

Figure 8:
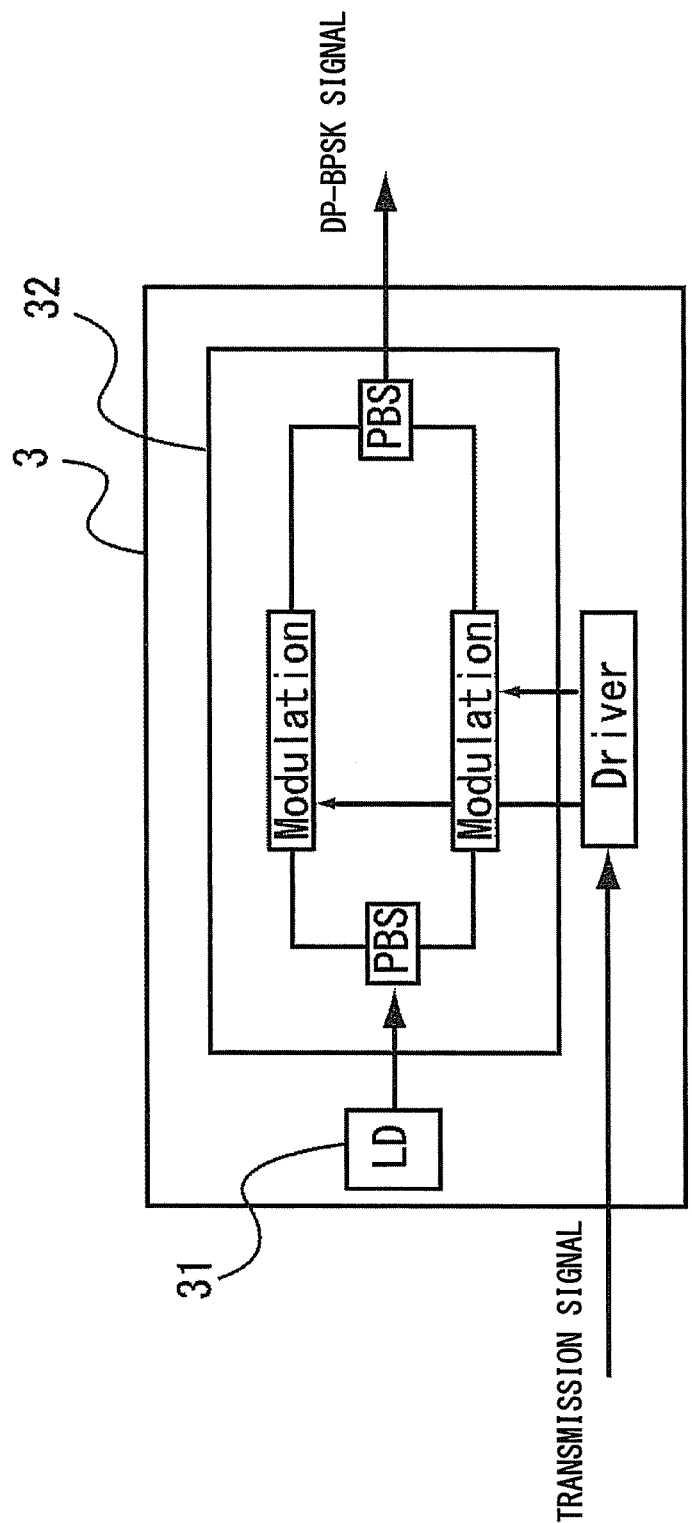
FIG. 8 is a diagram of an optical transmitter 3 according to second embodiment of the present invention.

FIG. 8 is a diagram showing the structure of the optical transmitter 3. The optical transmitter 3 is provided with a circuit for generating and transmitting a DP-BPSK signal. The optical transmitter 3 is provided with a LD (Laser Diode) 31 that generates CW (Continuous Wave) light as a light source of signal light and a DP-BPSK modulator 32 that performs DP-BPSK modulation for CW light of the LD 31 with an input electric signal (input signal).

In the DP-BPSK modulator 32, the CW light is divided into two light beams, the two light beams are respectively subjected to BPSK modulation, then polarization planes are orthogonalized at 90 degrees, and performs multiplexing, thereby generating a polarization multiplexed signal. The optical transmitter 3 indicates the structure of a general DP-BPSK transmitter.

Figure 9:
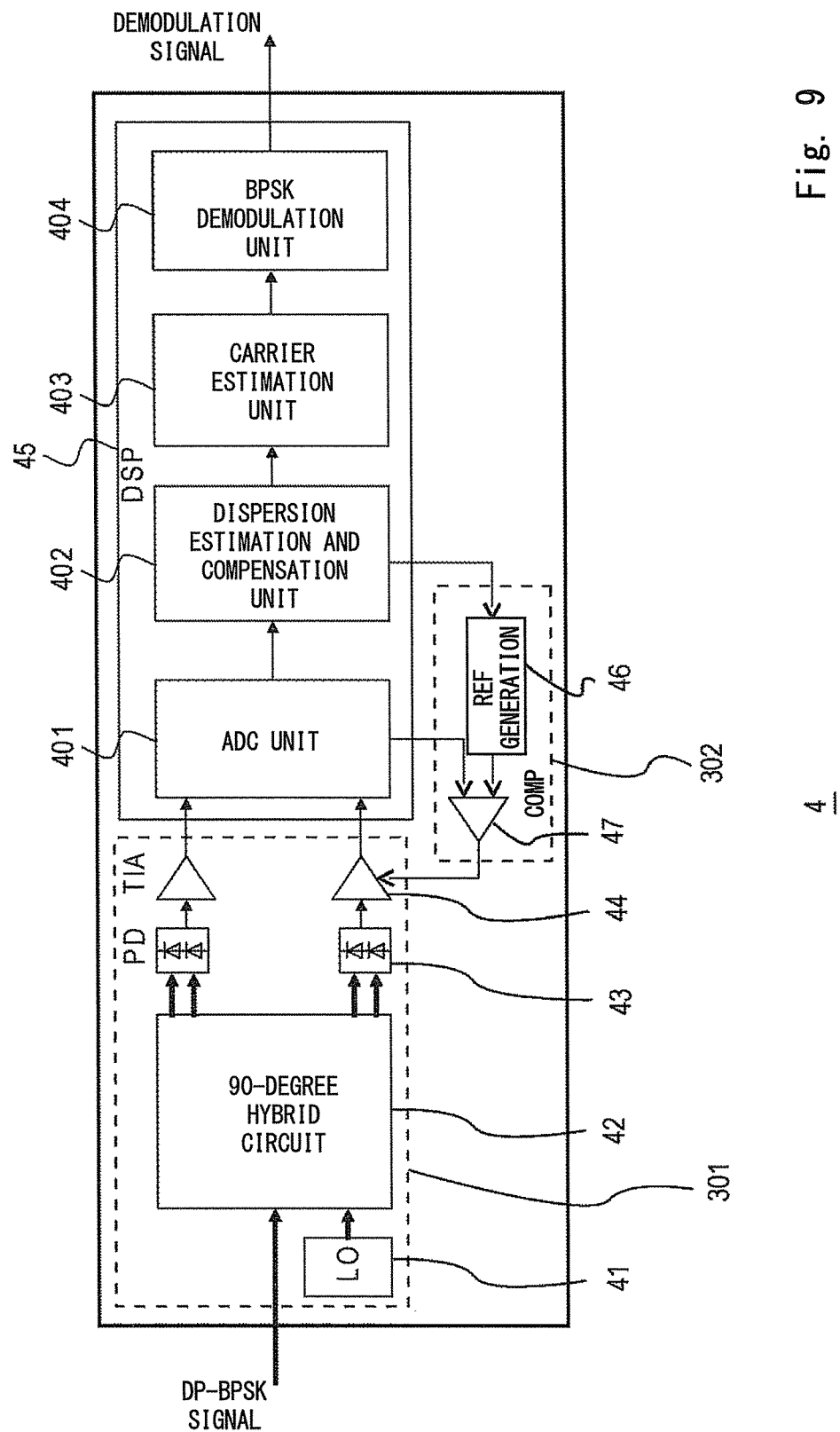
FIG. 9 is a diagram of an optical receiver 4 according to second embodiment of the present invention.

FIG. 9 is a diagram showing the structure of the optical receiver 4. The optical receiver 4 is provided with a photoelectric conversion unit 301 to which an optical signal is input and which causes the light to be interfered with local light and converts the optical signal into an electric signal, a conversion and demodulation unit 45 that converts the analog electric signal that is input from the photoelectric conversion unit 301 into a digital signal and performs wavelength dispersion compensation and demodulation for the DP-BPSK signal by digital processing, and an amplitude control unit 302.

The photoelectric conversion unit 301 is provided with a local light generation unit (LO; Local Oscillator) 41 that generates local light, a 90-degree hybrid circuit 42 to which the local light from the LO 41 and the received DP-BPSK signal are input and which causes the light and the signal to be interfered with each other, PDs (Photo Diodes) 43 that perform coherent detection for the optical signal interfered in the 90-degree hybrid circuit 42 and convert the signal into an analog electric signal, and analog amplifiers (TIAs; Trans Impedance AMPs) 44 to which the analog electric signal from the PDs 43 is input and which amplify the analog electric signal to a predetermined amplitude by a gain control signal from a comparator (COMP; Comparator) 47.

FIG. 9 shows a block diagram of the internal structure of the conversion and demodulation unit 45. The conversion and demodulation unit 45 is provided with an ADC unit 401 that converts the analog electric signal into a digital signal, a dispersion estimation and compensation unit 402 that performs estimation and compensation for wavelength dispersion and polarization dispersion, a carrier estimation unit 403 that extracts a carrier from the signal that has been subjected to the digital conversion and reproduces a clock, and a BPSK demodulation unit 404 that demodulates a BPSK signal to generate an electric signal (output signal) having the same waveform as the original signal.

The ADC unit 401 monitors average amplitude of the input analog electric signals and outputs a monitored value to the comparator 47.

The dispersion estimation and compensation unit 402 outputs a dispersion estimation result to a reference generation circuit 46. The carrier estimation unit 403 detects phase states of the local light and the signal light that have been subjected to the dispersion compensation and performs phase correction. The BPSK demodulation unit 404 demodulates the phase-corrected signal and restores the signal to an transmission signal having the same waveform as the original signal.

Figure 10:
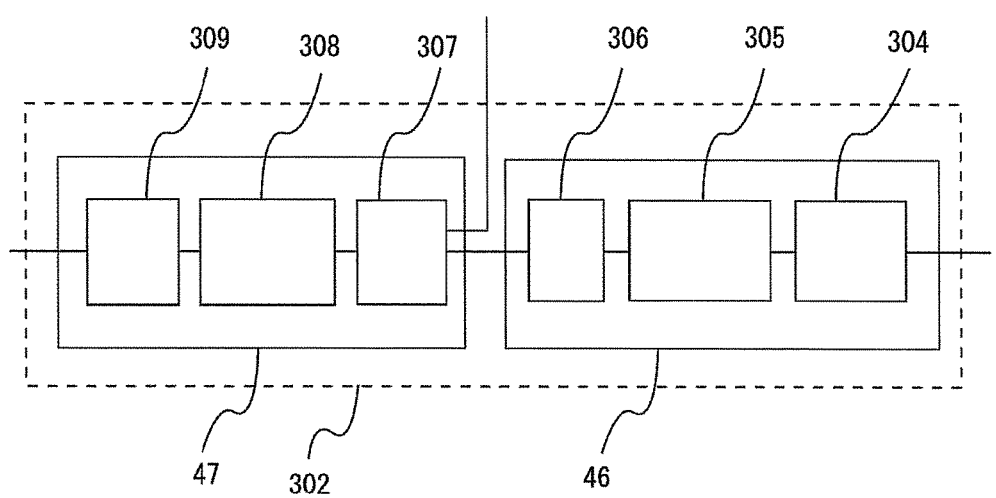
FIG. 10 is a diagram of a amplitude control unit 302 according to second embodiment of the present invention.

FIG. 10 is a diagram showing the internal structure of the amplitude control unit 302. The amplitude control unit 302 is provided with the reference generation circuit 46 to which a wavelength dispersion estimation result is input from the conversion and demodulation unit 45 and which generates a reference value and the comparator (COMP) 47 to which the amplitude monitored value of the analog electric signal is input from the conversion and demodulation unit 45 and which compares the reference value that is input from the reference generation circuit 46 therewith and outputs a gain control signal to the analog amplifier 44.

As shown in FIG. 10, the reference generation circuit 46 is provided with an input unit 304 serving as an interface to which the wavelength dispersion estimation value output from the dispersion estimation and compensation unit 402 is input, a computation unit 305 that calculates an optimal reference value on the basis of the wavelength dispersion estimation value, and an output unit 306 serving as an interface for outputting the reference value to the comparator 47. The structure described above is merely an example, and another device structure may be used.

As shown in FIG. 10, the comparator 47 is provided with an input unit 307 serving as an interface to which the reference value output from the reference generation circuit 46 and the amplitude monitored value output from the ADC unit are input, a comparison unit 308 that compares the reference value and the amplitude monitored value with each other, and an output unit 309 serving as an interface for outputting a gain control signal based on a result of the comparison between the reference value and the amplitude monitored value to the analog amplifier 44. The structure described above is merely an example, and another device structure may be used.

Subsequently, with reference to FIG. 11 and FIG. 6, processing of the communication system 300 according to this embodiment will be described. The optical transmitter 3 uses the input electric signal to perform the DP-BPSK modulation for the CW light from the LD 31 and transmits the light to the transmission channel. The optical receiver 4 inputs the DP-BPSK optical signal input from the transmission channel and the local light generated in the local light generation unit 41 to the 90-degree hybrid circuit 42. The 90-degree hybrid circuit 42 divides the input optical signal and the local light into two, respectively, adjusts the polarization and the phase so as to be able to demodulate the DP-BPSK signal, and multiplexes the optical signal and the local light.

The 90-degree hybrid circuit 42 inputs the multiplexed light to the two PDs 43 and causes the signal light and the local light to be interfered with each other, thereby converting the phase modulation into an amplitude modulation and generating an analog electric signal. The analog electric signal is faint, so the signal is amplified to a predetermined amplitude by the analog amplifiers 44. At this time, the comparator 47 uses a control signal to adjust a gain of the analog amplifier 44 in such a manner that the signal amplitude in the input of the ADC unit 401 in the conversion and demodulation unit 45 becomes constant.

Figure 11:
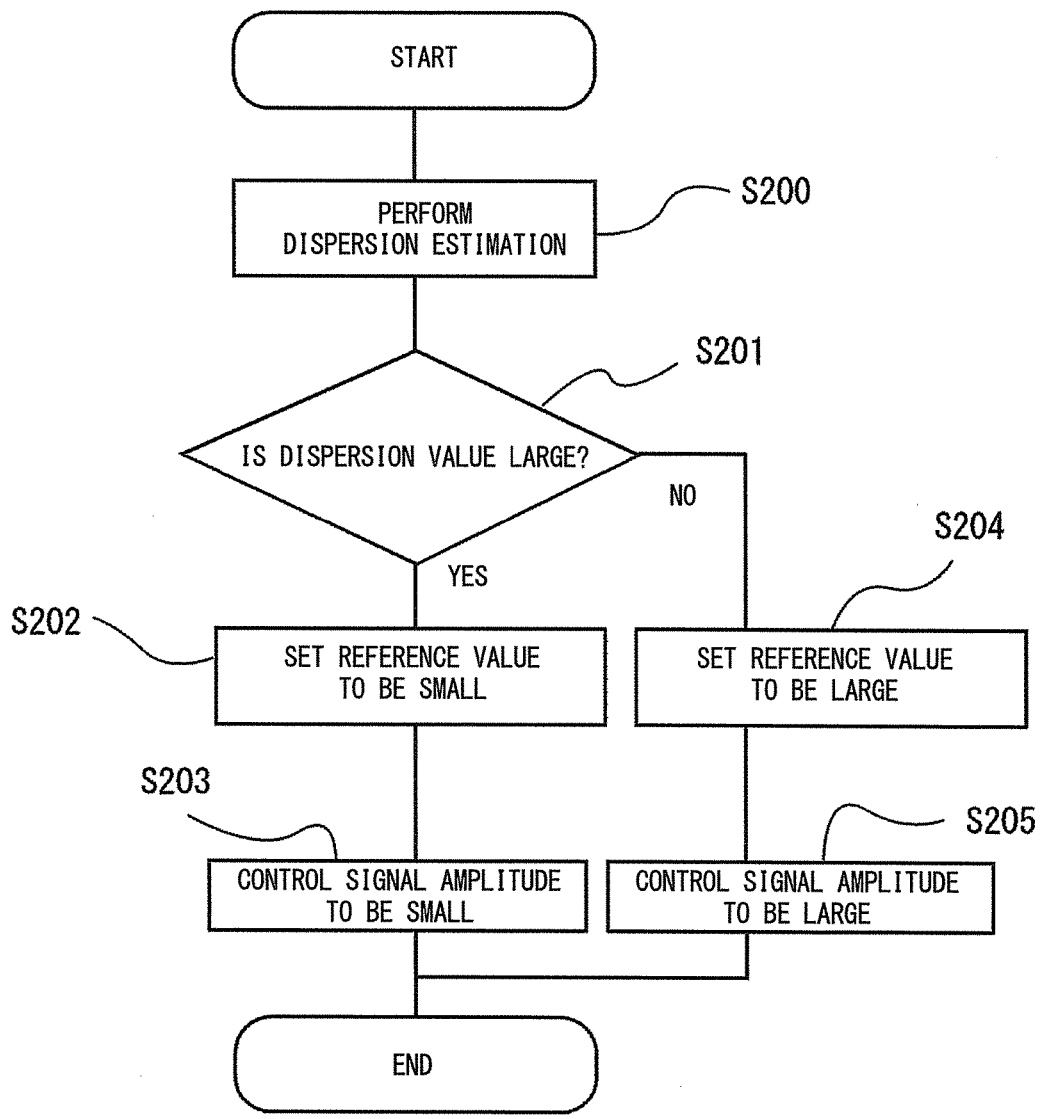
FIG. 11 is a flowchart of a communication method according to second embodiment of the present invention.

FIG. 11 is a flowchart showing the processing of a communication method for the communication system 300. The optical signal transmitted from the optical transmitter 3 is received by the optical receiver 4. The optical receiver performs computation of a wavelength dispersion estimation value of the received optical signal (S200). The optical receiver 4 compares the wavelength dispersion estimation value with the predetermined reference value to determine whether the wavelength dispersion estimation value is larger than the reference value or not (S201).

In the case where the optical receiver 4 determines that the dispersion value is larger than the reference value (S201: yes), the optical receiver 4 sets the reference value to be small (S202). On the basis of the reference value, the optical receiver 4 controls the amplitude of the analog electric signal to be small (S203). In the case where the optical receiver 4 determines that the dispersion value is smaller than the reference value (S201: no), the optical receiver 4 sets the reference value to be large (S204). On the basis of the reference value, the optical receiver 4 controls the amplitude of the analog electric signal to be large (S205).

The processing of the units of the optical receiver 4 is the same as the sequence diagram shown in FIG. 6. Hereinafter, as shown in FIG. 6, the processing of each component of the communication system 300 will be described in detail.

As an initial state, the reference generation circuit 46 generates a reference value in the case where the wavelength dispersion estimation value is at the maximum, that is, a minimum reference value, and the comparator 47 uses the reference value to set the gain of the analog amplifier 44. In the case of the maximum wavelength dispersion of the transmission signal, the maximum peak value of the signal amplitude is obtained. The comparator 47 performs control to set the gain of the TIA 44 to be small with the minimum reference value, so the input amplitude to the ADC unit 401 does not exceed the dynamic range.

The analog amplifier 44 amplifies the analog electric signal and inputs the signal to the conversion and demodulation unit 45. The conversion and demodulation unit 45 samples the input analog electric signal in the ADC unit 401 and converts amplitude information to a digital signal.

The ADC unit 401 monitors the amplitude of the electric signal and outputs a monitored value to the comparator 47. The ADC unit 401 performs sampling on the basis of the waveform of the analog signal, converts the analog signal into a digital signal, and inputs the signal to the dispersion estimation and compensation unit 402. The dispersion estimation and compensation unit 402 estimates a wavelength dispersion value and a polarization dispersion value by a numerical value calculation and compensates the dispersions on the basis of the estimation result.

The dispersion estimation and compensation unit 402 also outputs the wavelength dispersion estimation value to the reference generation circuit 46. The carrier estimation unit 403 detects phase states of the signal light and the local light of the signal that has been subjected to the dispersion compensation and performs phase correction. The BPSK demodulation unit 404 demodulates the signal that has been subjected to the phase correction and restores the signal to the original signal.

The reference generation circuit 46 inputs the wavelength dispersion estimation value from the dispersion estimation and compensation unit 402 of the conversion and demodulation unit 45 through the input unit 304. The input unit 304 outputs the wavelength dispersion estimation value to the computation unit 305. The computation unit calculates an optimal reference value corresponding to the wavelength dispersion value in such a manner that the input amplitude to the ADC unit 301 becomes optimal, in accordance with the wavelength dispersion estimation value from the dispersion estimation and compensation unit 402. As the reference value computation means, a table may be referred to, or calculation may be used. The computation unit outputs the reference value to the comparator 47 through the output unit 306.

Here, in the case where the wavelength dispersion of the transmission signal is smaller than the predetermined reference value, a difference between signal amplitude after the dispersion compensation and a peak value of signal amplitude of an electric signal before the dispersion becomes small. As a result, in order to enhance reception sensitivity of a signal, it is possible to increase the input amplitude of the analog signal to the ADC unit 301. In view of this, in signal processing in the conversion and demodulation unit 45, the gain of the TIA is increased so as not to be outside of the dynamic range, and the input amplitude to the ADC unit is optimized.

The comparator 47 inputs the amplitude monitored value of the analog electric signal from the ADC unit 301 of the conversion and demodulation unit 45 and the reference value from the reference generation circuit 46 through the input unit 307. The input unit 307 outputs the amplitude monitored value and the reference value to the comparison unit 308. The comparison unit 308 compares the amplitude monitored value and the reference value with each other.

Through the output unit 309, the comparison unit 308 performs control to set the gain of the analog amplifier 44 to be small in the case where the amplitude monitored value is larger than the reference value and performs control to set the gain of the analog amplifier 44 to be large in the case where the amplitude monitored value is smaller than the reference value.

That is, in the case where the amplitude monitored value is larger than the reference value, the comparison unit 308 performs control to set the amplitude of the analog electric signal to be small. Further, in the case where the amplitude monitored value is smaller than the reference value, the comparison unit 308 performs control to set the amplitude of the analog electric signal to be large. Note that in the case where the reference value is equal to the amplitude monitored value, the comparison unit 308 does not control the amplitude of the analog electric signal. By this control, the analog amplifier 44 makes an adjustment in such a manner that the amplitude of the analog signal to be output is equal to the reference value output from the reference generation circuit 46.

In the analog electric signal output from the analog amplifier 44, a waveform thereof is distorted due to the dispersion of the transmission channel, a temporal distribution of the signal is expanded along with an increase in the wavelength dispersion value, and a variation of the amplitude is increased due to superposition of the signals. As a result, in the case where the wavelength dispersion of the transmission channel is large, the peak value of the electric signal before the dispersion compensation is increased relative to the signal amplitude after the dispersion compensation. On the other hand, in the case where the wavelength dispersion value of the transmission channel is small, the temporal distribution of the signal is small, and the variation of the amplitude becomes small, so it is possible to increase the input amplitude of the analog signal to the ADC unit 401 within an acceptable range of the ADC unit 401.

Further, as an example, the control method for the amplitude of the analog electric signal may be a method as follows: in the case where a first amplitude corresponding to a first wavelength dispersion value as a reference is provided, if a second wavelength dispersion value is smaller than the first wavelength dispersion value, control is performed to set a second amplitude to be larger relative to the first amplitude, and if the second wavelength dispersion value is larger than the first wavelength dispersion value, control is performed to set the second amplitude to be smaller relative to the first amplitude.

Explanation of Effects

According to this embodiment, the wavelength dispersion value of the reception signal which is estimated by the dispersion estimation and compensation unit 402 of the conversion and demodulation unit 45 is input to the reference generation circuit, and in accordance with the estimated wavelength dispersion value, the reference value can be changed. As a result, it is possible to perform the gain control for the analog amplifier 44 in such a manner that the input amplitude to the ADC unit 401 becomes optimal in accordance with the wavelength dispersion value of the reception signal, and optimally adjust the reception sensitivity.

Through the above processing, in accordance with the wavelength dispersion value of the transmission channel of the optical signal, the DP-BPSK optical receiver 2 can adjust the amplitude of the analog electric signal in the input of the ADC unit 401 of the optical receiver 4 to an optimal value at all times, with the result that a reduction in the reception sensitivity of the signal can be avoided.

Other Embodiments

The optical communication method described in the above embodiment is realized using semiconductor processing units each including an application specific integrated circuit (ASIC). These types of processing may be performed by causing a computer system including at least one processor (e.g. microprocessor, MPU, or digital signal processor (DSP)) to execute a program. Specifically, these types of processing may be performed by generating one or more programs including instructions for causing a computer system to execute an algorithm about the types of processing and then providing these programs to a computer.

These programs may be stored in various types of non-transitory computer-readable media and then provided to a computer. Such non-transitory computer-readable medium include various types of tangible storage media. Examples of the non-transitory computer-readable media include magnetic storage media (e.g. flexible disks, magnetic tapes, hard disk drives), magneto-optical storage media (e.g. magneto-optical disks), compact disc read-only memory (CD-ROM), CD-R, CD-R/W, semiconductor memory (e.g. mask ROM, programmable ROM (PROM), erasable PROM (EPROM), flash ROM, and random access memory (RAM).

The programs may be provided to a computer by various types of transitory computer-readable media. Examples of such transitory computer-readable media include electric signals, optical signals, and electromagnetic waves. Such transitory computer-readable media can provide the programs for a computer through a wire communication path such as an electric line or an optical fiber, or a wireless communication path.

Note that the present invention is not limited to the above embodiments and can be appropriately changed without departing from the gist of the present invention. For example, the present invention may be applied to a quadrature amplitude modulation (QAM), an orthogonal frequency division multiplexing (OFDM), or other digital communication systems.

Further, the above embodiment is only illustrative of the application of the technical idea obtained by the present inventors. That is, the technical idea, is not limited to only the above embodiment, and various changes can, of course, be made to the embodiment.

For example, part or all of the above embodiment can be described as the Supplementary Notes below, but the embodiment is not limited thereto.
(Supplementary Note 1)

A communication system which comprises an optical transmitter to which an transmission signal is input, and which modulates the transmission signal to an optical signal and transmits the optical signal: and an optical receiver that receives the optical signal and demodulates the optical signal to an transmission signal, wherein the optical receiver includes a photoelectric conversion means for converting the optical signal into an analog electric signal, a conversion and demodulation means for converting the analog electric signal into a digital signal and demodulating the signal to the transmission signal, and an amplitude control means for controlling amplitude of the analog electric signal, and the amplitude control means controls the amplitude of the analog electric signal in accordance with wavelength dispersion of the optical signal.
(Supplementary Note 2)

The communication system according to Supplementary Note 1, wherein the amplitude control means controls the amplitude of the analog electric signal to become smaller, as the wavelength dispersion of the optical signal is increased.
(Supplementary Note 3)

The communication system according to Supplementary Note 1 or 2, wherein the photoelectric conversion means includes an amplifier that amplifies the analog electric signal input to the conversion and demodulation means, and the amplitude control means estimates a wavelength dispersion value of the optical signal and determines, on the basis of the estimated wavelength dispersion value, a reference value for controlling a gain of the amplifier.
(Supplementary Note 4)

An optical receiver comprising:

a photoelectric conversion means for converting an optical signal into an analog electric signal;

a conversion and demodulation means for converting the analog electric signal into a digital signal and demodulating the signal to an transmission signal; and an amplitude control means for controlling amplitude of the analog electric signal, wherein the amplitude control means controls the amplitude of the analog electric signal in accordance with wavelength dispersion of the optical signal.

(Supplementary Note 5)

The optical receiver according to Supplementary Note 4, wherein the amplitude control means controls the amplitude of the analog electric signal to become smaller, as the wavelength dispersion of the optical signal is increased.

(Supplementary Note 6)

The optical receiver according to Supplementary Note 4 or 5, wherein the photoelectric conversion means includes an amplifier that amplifies the analog electric signal input to the conversion and demodulation means, and the amplitude control means estimates a wavelength dispersion value of the optical signal and determines, on the basis of the estimated wavelength dispersion value, a reference value for controlling a gain of the amplifier.

(Supplementary Note 7)

An optical receiver control method, wherein an optical receiver is configured to convert an optical signal into an analog electric signal, convert the analog electric signal into a digital signal, and demodulate the signal to an transmission signal, the control method comprising controlling amplitude of the analog electric signal in accordance with wavelength dispersion of the optical signal.

(Supplementary Note 8)

The optical receiver control method according to Supplementary Not 7, wherein the controlling includes controlling the amplitude of the analog electric signal to become smaller, as the wavelength dispersion of the optical signal is increased.

(Supplementary Note 9)

The optical receiver control method according to Supplementary Note 7 or 8, wherein the optical receiver includes an amplifier that amplifies the analog electric signal input to a conversion and demodulation means, and the controlling includes estimating a wavelength dispersion value of the optical signal and determining, on the basis of the estimated wavelength dispersion value, a reference value for controlling a gain of the amplifier.

(Supplementary Note 10)

A non-transitory computer readable medium for causing a computer to execute an optical receiver control method, wherein an optical receiver is configured to convert an optical signal into an analog electric signal, convert the analog electric signal into a digital signal, and demodulate the digital signal to an transmission signal, and the control method includes controlling amplitude of the analog electric signal in accordance with wavelength dispersion of the optical signal.

(Supplementary Note 11)

The non-transitory computer readable medium according to Supplementary Not 10, wherein the controlling includes controlling the amplitude of the analog electric signal to become smaller, as the wavelength dispersion of the optical signal is increased.

(Supplementary Note 12)

The non-transitory computer readable medium according to Supplementary Note 10 or 11, wherein the optical receiver includes an amplifier that amplifies the analog electric signal input to a conversion and demodulation means, and the controlling includes estimating a wavelength dispersion value of the optical signal and determining, on the basis of the estimated wavelength dispersion value, a reference value for controlling a gain of the amplifier.

While the invention of the present application has been described with reference to the embodiment, the invention is not limited thereto. Various changes understandable by those skilled in the art can be made to the configuration or details of the invention of the present application without departing from the scope of the invention.

The present application claims priority based on Japanese Patent Application No. 2013-145488, filed on Jul. 11, 2013, the disclosure of which is incorporated herein in its entirety.

REFERENCE SIGNS LIST 1 optical transmitter
2 optical receiver
3 optical transmitter
4 optical receiver
11 LD (Laser Diode)
12 DP-QPSK modulator
21 local light generation unit (LO; Local Oscillator)
22 90-degree hybrid circuit
23 PD (Photo Diode)
24 analog amplifier (TIA; Trans Impedance AMP)
25 conversion modulation unit (DSP)
26 reference generation circuit
27 comparator (COMP)
31 LD (Laser Diode)
32 DP-BPSK modulator
41 local light generation unit (LO; Local Oscillator)
42 90-degree hybrid circuit
43 PD (Photo Diode)
44 analog amplifier (TIA; Trans Impedance AMP)
45 conversion and demodulation unit (DSP)
46 reference generation circuit
47 comparator (COMP)
100 optical communication system
101 photoelectric conversion unit
102 amplitude control unit
104 input unit
105 computation unit
106 output unit
107 input unit
108 comparison unit
109 output unit
201 ADC unit
202 dispersion estimation and compensation unit
203 carrier estimation unit
204 QPSK demodulation unit
300 optical communication system
301 photoelectric conversion unit
302 amplitude control unit
304 input unit
305 computation unit
306 output unit
307 input unit
308 comparison unit
309 output unit
401 ADC unit
402 dispersion estimation and compensation unit
403 carrier estimation unit
404 BPSK demodulation unit

500 optical communication system
501 ADC unit
521 local light generation unit (LO; Local Oscillator)
522 90-degree hybrid circuit
523 PD (Photo Diode)
524 analog amplifier (TIA; Trans Impedance AMP)
525 conversion and demodulation unit (DSP)
526 reference generation circuit
527 comparator (COMP)
550 optical transmitter
560 optical receiver

The invention claimed is:

1. A communication system comprising:
   an optical transmitter to which a transmission signal is input, and which modulates the transmission signal to an optical signal and transmits the optical signal; and
   an optical module that receives the optical signal and demodulates the optical signal to the transmission signal, wherein
   the optical module includes a photoelectric converter configured to convert the optical signal into an analog electric signal, an analog digital converter configured to convert the analog electric signal into a digital signal, a digital signal processor configured to process the digital signal, and a controller configured to receive an amplitude value of the analog electric signal and a wavelength dispersion value of the optical signal, and
   wherein the controller is further configured to control an amplitude of the analog electric signal based on the amplitude value and a reference amplitude value based on the wavelength dispersion value.

2. The communication system according to claim 1, wherein the controller is further configured to control the amplitude of the analog electric signal to become smaller as the wavelength dispersion value is increased.

3. The communication system according to claim 1, wherein
   the photoelectric converter includes an amplifier that is configured to amplify the analog electric signal input to the analog digital converter, and
   the controller is further configured to estimate the wavelength dispersion value and determine, based on the estimated wavelength dispersion value, the reference amplitude value for controlling a gain of the amplifier.

4. An optical module comprising:
   a photoelectric converter configured to convert an optical signal into an analog electric signal;
   an analog digital converter configured to convert the analog electric signal into a digital signal;
   a digital signal processor configured to process the digital signal; and
   a controller configured to receive an amplitude value of the analog electric signal and a wavelength dispersion value of the optical signal,
   wherein the controller is further configured to control an amplitude of the analog electric signal based on the amplitude value and a reference amplitude value based on the wavelength dispersion value.

5. The optical receiver according to claim 4, wherein the controller is further configured to control the amplitude of the analog electric signal to become smaller as the wavelength dispersion value of the optical signal is increased.

6. The optical receiver according to claim 4, wherein
   the photoelectric converter includes an amplifier that is configured to amplify the analog electric signal input to the analog digital converter, and
   the controller is further configured to estimate the wavelength dispersion value and determine, based on the estimated wavelength dispersion value, the reference amplitude value for controlling a gain of the amplifier.

7. An optical module control method,
   wherein the optical module receiver performs operations comprising:
   converting an optical signal into an analog electric signal;
   converting the analog electric signal into a digital signal;
   processing the digital signal;
   receiving an amplitude value of the analog electronic signal and a wavelength dispersion value of the optical signal;
   demodulating the optical signal to a transmission signal; and
   controlling an amplitude of the analog electric signal based on the amplitude value and a reference amplitude value based on the wavelength dispersion value.

8. The optical module control method according to claim 7, wherein the controlling includes controlling the amplitude of the analog electric signal to become smaller as the wavelength dispersion value is increased.

9. The optical module control method according to claim 7, wherein
   the optical module includes an amplifier that is configured to amplify the analog electric signal input to the analog digital converter, and
   the controlling includes estimating the wavelength dispersion value and determining, based on the estimated wavelength dispersion value, the reference amplitude value for controlling a gain of the amplifier.

* * * * *